June 12, 1962     D. D. MUSGRAVE     3,039,010
ELECTRIC CIRCUIT CONTROL SYSTEMS
Filed Nov. 5, 1959     2 Sheets-Sheet 1
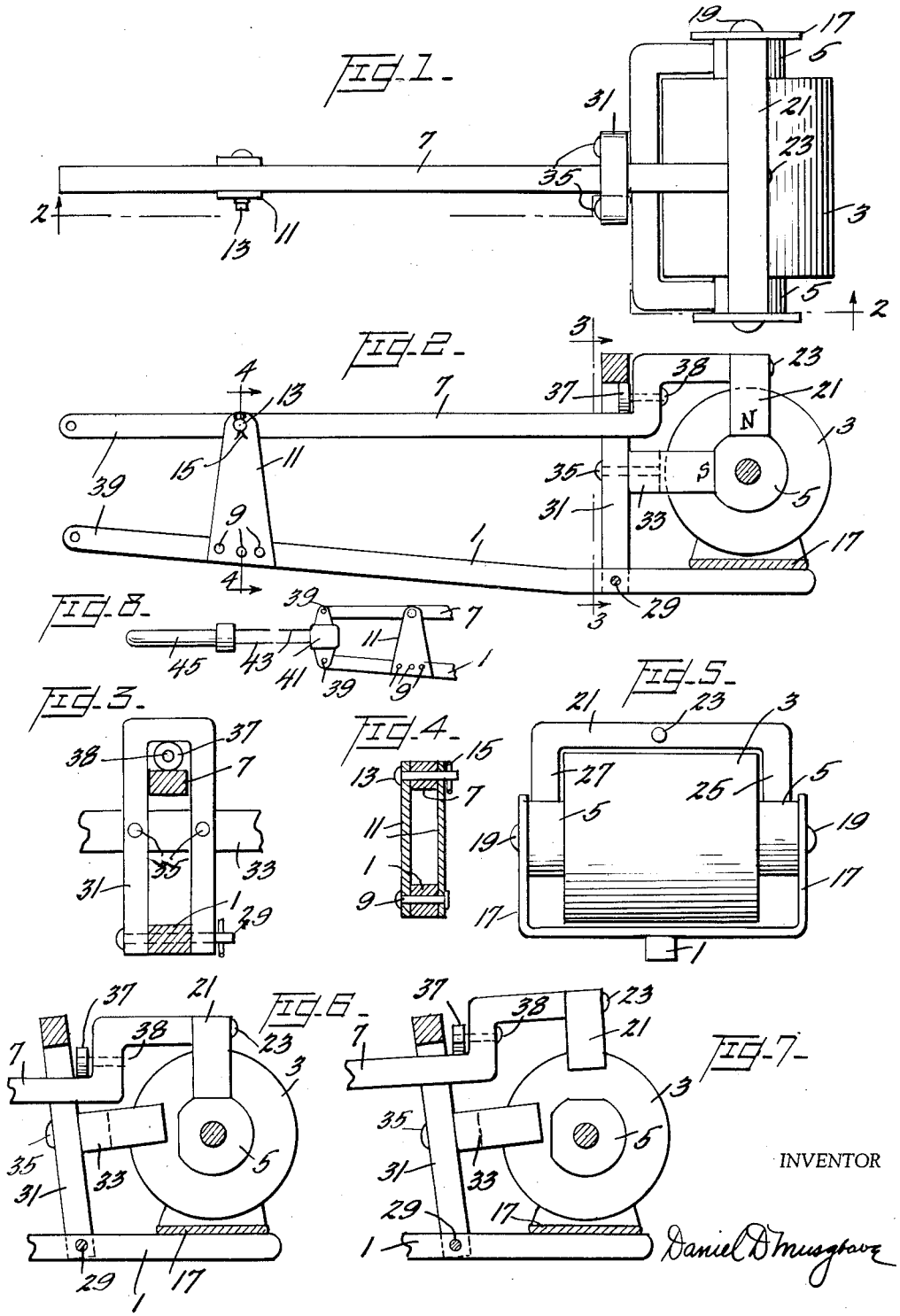
INVENTOR
Daniel D. Musgrave June 12, 1962   D. D. MUSGRAVE   3,039,010
ELECTRIC CIRCUIT CONTROL SYSTEMS
Filed Nov. 5, 1959   2 Sheets-Sheet 2
FIG. 9a
Current Characteristic
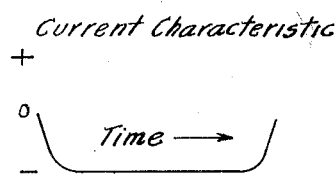
| Situation | Effect |
|---|---|
| Circuit Continuity Test | $I^2R$ in Coil |
FIG. 9b
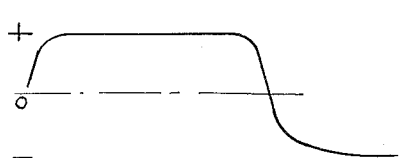
| Normal Actuating Cycle | Unlatch Arm and Fire |
FIG. 9c
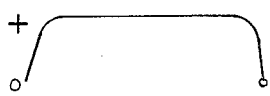
| Power Failure After Unlatching | Armed During Lag in Engagement of Latch |
FIG. 9d
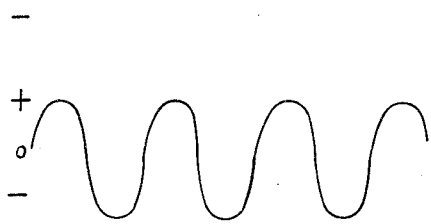
| Typical Extraneous Current | $I^2R$ and Chatter |
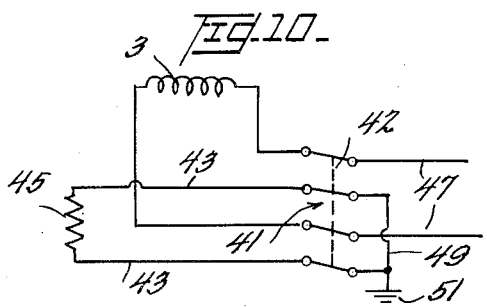
FIG. 10
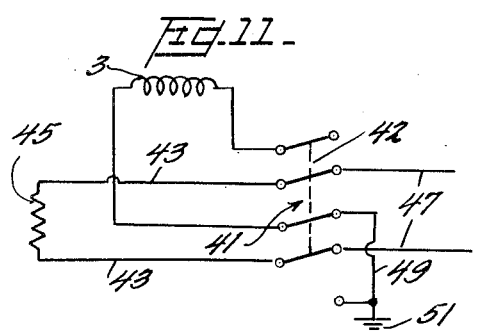
FIG. 11
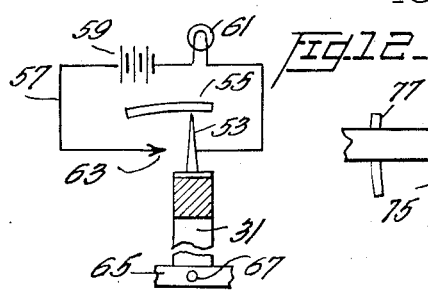
FIG. 12
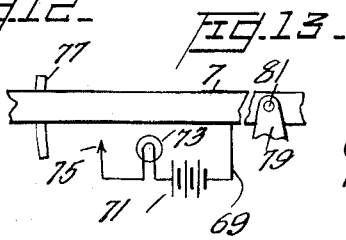
FIG. 13
INVENTOR
Daniel D Musgrave

REISSUED

United States Patent Office 3,039,010
Patented June 12, 1962

---

3,039,010
ELECTRIC CIRCUIT CONTROL SYSTEMS
Daniel D. Musgrave, 8201 Caraway St., Cabin John, Md.
Filed Nov. 5, 1959, Ser. No. 851,058
14 Claims. (Cl. 307—94)

This invention relates generally to electric circuit control systems and more particularly to such a system in which electric currents of definite and predetermined voltage and current characteristics are impressed into or within the system to cause a controlled or operative unit to function.

The invention will be disclosed as applied in high-energy devices, such as rocket systems in which, for example, the operative unit function consists of the ignition of fuels which is accomplished by the heating effect of an electric current passing through a resistance bridgewire or squib. However, it is desired to point out that the invention may be applied to other controlled operative units, such as other responsive electric circuits or mechanically actuated operations wherein other end effects are produced.

The present invention contemplates including in a control system a unit or actuator having critical electrical selectivity characteristics that will reject spurious electrical pulses and will respond only to a control current of a definite voltage and current pattern. This invention will be useful in any system controlled by an electric circuit whether the operating unit of such arrangements be an igniter, a reactor, a catalytic agent, an electric relay, sonic or optical units, or various combinations of the above and to mechanical devices. The invention will be disclosed herein as applied to the ignition initiating circuit of a missile or rocket engine, the ignition of which is normally accomplished electrically from a remote control station.

A constant source of concern in the launching of a missile is the possibility of extraneous and premature electric currents heating the bridgewire to ignition temperature. These hazards associated with electric igniters are difficult to evade as the energy levels specified for intentional initiation are comparatively low in order that the igniter will respond without lag to a weak firing electric pulse. A specified range of sensitivity is held during manufacture of the igniter, but of course, it is not possible to specify the environmental hazards to which the ultimate user may subject the device.

The principal sources of extraneous electricity that could supply the firing current to the igniter are lightning, static charges, galvanic action and electro-magnetic radiation from communication systems, and search and navigation devices. Very little can be done about lightning, but careful design can largely circumvent danger from static and galvanic action. The problem of high-frequency radiant energy is severe, particularly because it can be transmitted without a physical connection. The situation can be improved to some extent by shielding, but considerable danger remains.

In consideration of the aforementioned difficulties, the principal object of this invention is to provide a control system for electric operative circuits that will reduce the possibilities of their functioning by extraneous or spureous electric currents.

Another object is to provide a control system that will permit the shorting and grounding of the operative current conductors until just before firing currents are to be applied thereto.

Another object is to provide means for isolating the long control circuitry from the actual firing circuitry leading to the firing squibs, until just before firing is desired.

Another object is to provide a control system that will positively indicate its condition of readiness.

Another object is to provide a control system that is capable of remote arming and disarming, but with comparatively short conductors connected to the firing circuits.

Another object is to provide a control system that will revert to a disarmed status in the event of power-failure after remote initiated arming.

Another object is to provide a control system that does not require energizing to maintain it in a safe status.

Another object is to provide a control system in which inadvertent shifting of polarity of the conductors would not cause the operating circuit to function.

Another object is to provide such a control that requires only a two-conductor circuit for continuity testing and operation.

Another object is to provide a control system that will pass the firing current to the igniter only when currents of opposite directions are impressed on the system in a predetermined sequence.

These and other objects and advantages of the invention will be apparent from the detailed description hreinafter set forth and from the drawing made a part thereof in which:

FIGURE 1 is a plan view of a control actuator included as a unit in the system of this invention;

FIGURE 2 is a side elevation, partly sectioned, of the control actuator shown in FIGURE 1;

FIGURE 3 is a section view taken on line 3—3 in FIGURE 2;

FIGURE 4 is a section view taken on line 4—4 in FIGURE 2;

FIGURE 5 is a right elevation, or end view, of the actuator shown in FIGURE 1;

FIGURES 6 and 7 are partial views, similar to FIGURE 2, but illustrating the relative positions of certain parts of the actuator at certain positions in the sequence of operation;

FIGURE 8 is a view of a switch positioned in the jaws of the control actuator with its output conductors leading to an igniter squib;

FIGURES 9a to 9d form a chart showing the effect produced on the control actuator by certain input currents or pulses;

FIGURE 10 is a circuit diagram showing the electrical connections of the system of this invention in its standby condition;

FIGURE 11 is the circuit diagram of FIGURE 10 with the system in condition for firing a squib;

FIGURE 12 is a side elevation view, as in FIGURE 2, showing the latching lever and means to move it and to indicate its position; and FIGURE 13 is a side elevation view, as in FIGURE 2, showing the operating lever and means to move it and to indicate its position.

Referring to the drawings in detail, there is shown a control actuator unit consisting mainly of a base 1, an electromagnetic coil 3, having an iron core 5, and a switch actuating lever 7.

Fixed to base 1 by rivets 9 or otherwise, is bracket 11 in which is mounted pin 13 which acts as a pivot for switch lever 7. Pin 13 may be retained in position by a suitable cottor pin 15.

Coil 3 is wound as a solenoid around core 5, which coil is mounted on base 1 by bracket 17 and suitable screws 19. Bracket 17 is made of some nonmagnetic material, such as brass. Core 5 is made of some material that will retain only a slight amount of residual magnetism when coil 3 is energized and de-energized. Soft iron would be a suitable material for core 5. Core 5 extends axially beyond the windings of coil 3 as shown in FIGURES 1 and 5.

A U-shaped permanent magnet 21 is fixed to the end of lever 7 by a suitable fastener 23. Magnet 21 is of such size and shape that when fastened to lever 7, its poles 25 and 27 may move to make contact and move away from the exposed portions of core 5.

Pivoted on base 1 by pin 29 is latch 31 to which is affixed by fasteners 35 a second U-shaped permanent magnet 33. Latch 31 may be made of some nonmagnetic material. The poles of permanent magnet 33 are so formed and so mounted on latch lever 31 as to be moved into contact with and away from the exposed portions of core 5, but with its poles oriented oppositely to the poles of magnet 21. When the system is at rest, core 5 acts as a keeper for magnets 21 and 33. If an unintentional attempt is made to assemble the two magnets with their poles similarly oriented, a repulsive effect will be noted between them.

Carried on lever 7 is spacer 37, which may be threaded internally and secured by a suitable screw 38 or other fastener. Spacer 37 provides an engagement surface for latch 31, as may be noted in FIGURE 2. To eliminate backlash in the latching and unlatching of latch 31 and lever 7, spacer 37 may be provided in several different diameters for selective use. To vary the distance that latch 31 moves before being disengaged from lever 7, spacer 37 may be made in several thicknesses for alternate or selected use.

In the present embodiment, mechanical actuation is had at jaws 39 which comprise the respective extremities of lever 7 and base 1. However, it is readily apparent that the lever 7, its fulcrum and latch 31 may be rearranged in various manners to actuate controls of various types.

In FIGURE 8 is shown a switch 41 positioned between actuating jaws 39. The output conductors 43 from switch 41 lead to the operating circuit, such as the igniter squib 45.

The circuit connections of control current conductors 47 coming from a distant control station (not shown) to switch 41, coil 3 and squib 45, are shown in FIGURES 10 and 11, for the two positions of switch 41 the power furnished by the distant control station may be from a direct current source, such as a battery, and a conventional polarity reversing switch may be employed to reverse the direction of flow of the pulse current. Thus in the disclosed embodiment of the invention, the operative unit consists of the squib 45, the switch 41, and the responsive control member, switch-arm 42. Jaws 39 move the switch arm 42. Conductor 49 is so connected between contacts on squib 45 and on switch 41 as to shunt or shortcircuit squib 45 when the switch 41 is in the position shown in FIGURE 10, in which position switch 41 delivers the control current pulse to coil 3. However, conductor 49 becomes ineffective as to short circuiting squib 45 when the switch 41 is in the position shown in FIGURE 11 and in this position switch 41 delivers the control current pulse from conductors 47 to squib 45.

Referring particularly in FIGURE 12, latch 31 is shown as having attached thereto a visual pointer 53 passing over scale 55, which may be secured in any conventional manner to any convenient support resting on base 1. As latch 31 is moved from its position as shown in FIGURE 2 to its position as shown in FIGURES 6 and 7, the pointer 53 moves over scale 55 and thus indicates a change in or status of its position and the position of magnet 33 relative to core 5. A conventional electrical circuit 57, consisting of battery 59, lamp 61, contact 63, and pointer 53, provide light visual indications of the relative positions of latch 31. A handle 65 is provided on latch 31 for the manual moving of latch 31. A hole 67 is provided in handle 65 for attachment of an operating cord or rod (not shown) to handle 65 for distant manual control of latch 31.

Referring to FIGURE 13, the relative position of lever 7 may be light visually indicated by the conventional electrical circuit 69 consisting of battery 71, lamp 73 and contact 75. Likewise, the relative position of lever 7 may be visually indicated by the position of the upper edge of lever 7 relative to scale 77 which may be secured in any conventional manner to any convenient support resting on base 1. Likewise, handle 79 may be secured to lever 7 to manually move lever 7 directly or by a cord or rod (not shown) for distant manual movement of lever 7.

*Operation*

It will be assumed that the device is in its rest or standby condition as shown more clearly in FIGURE 2, with switch 41 held in jaws 39 as shown in FIGURE 8, and circuit connections to coil 3 as shown in FIGURE 10.

Referring to FIGURE 9a to 9d, there is shown thereby a chart of currents of certain characteristics and a tabulation of the corresponding effect that each of the respective currents produces in the disclosed system.

Referring particularly to FIGURE 9a, if a "negative" electrical pulse (which is defined as the voltage across conductors 47 being increased in such values and with such signs of plus and minus as to cause a current to flow in the windings of coil 3 in a direction to cause the magnetic field in core 5 to increase in such a direction as to repel magnet 21) is applied to the system from the distant control station, no movement of either lever 7 or latch 31 occurs as magnet 33 is attracted with greater force to core 5 and latch 31 remains engaged with spacer 37 on lever 7. Lever 7 is thereby prevented from moving upward. The only effect of such a current pulse would be to create resistance losses in coil 3. It is obvious that the flow of such a current, as observed by a meter, would indicate the continuity of the coil and switch circuits.

If a "positive" pulse were inadvertently used as a test for continuity, the operative circuit would not be affected as the positive pulse by itself would merely move the latch 31 to its unlatched position and lever 7 would not move because of the increased attraction of magnet 21 to core 5.

Referring to FIGURE 9b, when the pulse is a compound pulse and consists of a positive and a negative portion in that sequence, the system will function to effect a normal operating cycle. With the system in its rest or stand-by condition, as defined hereinbefore, a compound pulse, as shown in FIGURE 9b, is applied at the distant control station and is impressed on coil 3 through conductors 47 and switch 41, which is in the position shown in FIGURE 10. During the first half of the pulse, core 5 repulses magnet 31, moving the upper part of latch 31 away from spacer 37 to a position shown in FIGURE 6. Upon the second half of the pulse being delivered to coil 3, the magnetic field in core 5 is reversed, repelling magnet 21 and moving lever 7 to close jaws 39 to move the switch 41 to open the short circuit of operating circuit 45 and to connect the power in conductors 47 directly to the operating circuit 45. Upon the reversal of the magnetic field in core 5, magnet 33 is not immediately drawn to core 5 as the airgap between the poles of magnet 33 and core 5 is of sufficient reluctance, and upon the slight lifting of magnet 21 from core 5, spacer 37 becomes positioned between latch 31 and lever 7, as shown in FIGURE 7. The adjustment of the relation between the movements of the two magnets may be made by selecting the thickness of spacer 37. Upon the termination of the pulse (see FIGURE 9b) through conductors 47, the residual magnetism in core 5 and the mutual attraction between the poles of magnets 21 and 33, restore the system to the rest position as shown in FIGURE 2.

It will thus be seen that it is possible with safety to unlatch the system by the use of the first half of the pulse as shown in FIGURE 9b, as the magnet 21, which is connected to lever 7, is drawn all the more forcibly toward core 5 and magnet 21 cannot move from core 5 until the second part of the pulse is applied to coil 3 from the distant control station, which may be done by the use of a conventional pole changer. Thus the test for continuity of circuits and the delatching of the system may be effected during countdown preparations for and until just before the firing of missiles.

FIGURE 9c illustrates the current actuation conditions should a power failure occur after an unlatching pulse has been impressed in the system. The unlatched conditions will not continue, as magnet 33 will be attracted to core 5 and latch 31 will be moved to its latched position.

Referring to FIGURE 9d, typical extraneous currents, such as might be caused by radio frequency disturbances, cannot cause arming or firing because the response time of the latch 31 is much greater than the half-cycle time of such currents.

If a direct and steady current were inadvertently impressed on the coil 3, it might cause unlatching, but a pulse of opposite polarity would be required to fire the squib, and this reversal must be accomplished quickly and before magnet 33 would accomplish re-latching. After power has been applied to squib 45 and squib 45 is burned out, no voltage or power is being applied to the system and core 5 is no longer being magnetized by currents flowing through coil 3. However, magnets 21 and 33 will be drawn to and will adhere to core 5 because of the residual magnetism in core 5. Lever 7 is thus prevented from moving, both by the attraction of magnet 21 to core 5, and by the mechanical engagement of latch 31 and the spacer 37, which is affixed to lever 7. The conductors 43 to squib 45 are shunted or short circuited by conductor 49, which is connected to switch 41. In some situations, it may be desirable to ground conductor 49, as at 51.

It is thus seen that this invention provides a system for the remote control of an operating circuit which is kept electrically isolated by a switch and shunting and grounding until a latch mechanism and a switch mechanism have been activated by applying a predetermined characterized compound electric pulse in a proper sequence to an electromagnet having a core that cooperates with two permanent magnets attached, respectively, to the latching mechanism and the switch. (The "contact" of the permanent magnets and the core of the electro-magnet may be actual physical contact, or substantial contact, with a slight air gap.)

In the particular embodiment disclosed the electrical source furnishes the power to magnetize the coil 3 and also to cause the operative unit circuit to function. The additional function of the electrical source is effected by the movement of the actuating lever moving the switch arm 42. It is of course obvious that if the operative unit is to be controlled by a mechanism such as a movable pin or fastener, the actuator lever 7 may be connected to said pin or fastener by a conventional link or rod and the electrical source supplies power only to coil 3.

What I claim is:

1. An electric control system comprising: a source of electrical currents of predetermined characteristics; an operative unit mounted on a base and having a responsive controlling member; an electro-magnetic coil mounted on said base and having a core therein; a first permanent magnet; an actuating lever pivoted on said base at a point along the length of said lever and on one end of which lever is mounted said first permanent magnet which magnet is adapted in position to be attracted to and repelled from said core; a second permanent magnet; a latch pivoted on said base and having mounted on one end of said latch said second permanent magnet which magnet is adapted in position to be attracted to and repelled from said core; whereby movement of said latch causes said latch to be engaged with or disengaged from said lever; conductors electrically connecting said electrical source with said coil; and means connecting the other end of said lever to said responsive controlling member.

2. The combination set forth in claim 1 and further defined by: said predetermined characteristics of said currents being such that the current first flows for a predetermined period in one direction and at the end of that period flows in the second or opposite direction, the first direction of flow being such that the poles created by such flow at the ends of said core repel the poles of the said second permanent magnet and move said latch into its disengaged position and the second direction of flow being such that the poles created by said second flow at the ends of said core repel the said first permanent magnet and thereby move said actuating lever.

3. The combination set forth in claim 1 and further defined by: said actuating lever at its point of engagement with said latch includes a spacer substitutable in size whereby the distance said latch moves from an engaging to a disengaging position may be adjusted.

4. The combination set forth in claim 1 and further defined by: said latch includes a pointer that moves in relation to said lever whereby the position of said latch relative to the said lever may be visually determined.

5. The combination set forth in claim 1 and further defined by: said actuating lever includes a pointer that moves in relation to said base whereby the position of said actuating lever relative to said base may be visually determined.

6. The combination set forth in claim 4 and further defined by: said pointer completes an electric indicating circuit when said latch is in its disengaged position relative to said actuating lever.

7. The combination set forth in claim 5 and further defined by: said pointer completes an electric indicating circuit when said actuating lever has been moved by said permanent magnet being repelled from said core.

8. The combination set forth in claim 1 and further defined by: said actuating lever at its point of engagement with said latch includes a spacer so positioned in relation to said latch that upon the unlatching and movement of the said actuating lever, the said spacer prevents the return of the latch to its engaging position with the said actuating lever.

9. The combination set forth in claim 1 and further defined by: the said source currents being of a bi-direction character and in such sequence of directions that the permanent magnet on said latch is caused to be repelled from said core by the magnetic poles created only by a definite part of said sequence of said currents, whereby the moving of said actuating lever is delayed until the said part current has unlatched the said actuating lever and the direction of said currents has been reversed.

10. An electro-responsive control system comprising: a source of electrical currents, having predetermined characteristics; an electric switch electrically connected to said source and having a throw arm; an electromagnetic coil having a core and mounted on a base and being electrically connected to said source via said switch when said switch is in its first position; an operative unit circuit electrically connected to said source via said switch when said switch is in its second position; an actuating lever pivoted on said base and connected at one of its ends to said throw arm; a latch pivoted on said base and adapted to move to engage and be disengaged from said actuating lever; a first permanent magnet fastened to and carried by said latch, whereby the poles of said first magnet are moved into contact with and away from said core; a second permanent magnet fastened to and carried by said actuating lever, whereby the poles of said second magnet are moved into contact with and away from said core; whereby said currents impressed on said coil through said switch first move said latch lever to its said disengaged position and later move said actuating lever to change the position of said switch.

11. The combination set forth in claim 10 and further defined by: said switch being provided with contacts and a conductor whereby the said operative circuit is short-circuited when the said switch in its first position to impress said currents on said coil.

12. The combination set forth in claim 11 and further definined by: said short-circuiting conductor being grounded.

13. An electro-responsive control system comprising: a source of electrical currents, having predetermined characteristics; an electric switch electrically connected to said source and having a throw arm; an operative circuit electrically connected to said switch; an electromagnetic coil mounted on a base and being electrically connected to said switch and having a core; an actuating lever pivoted on said base and connected at one of its ends to said throw arm; a latch pivoted on said base and adapted to move to engage and be disengaged from said actuating lever; a first permanent magnet fastened to and carried by said latch, whereby the poles of said first magnet are moved into contact and away from said core; a second permanent magnet fastened to and carried by said actuating lever, whereby the poles of said second magnet are moved into contact and away from said core; whereby said currents impressed on said coil through said switch first move said latch to its said disengaging position and later move said actuating lever to change the electrical position of said switch to connect said operative circuit to said source.

14. An electro-responsive control system comprising: a source of electrical currents having predetermined characteristics; an electric switch electrically connected to said source and having a throw arm; an operative circuit electrically connected to said switch; an electromagnetic coil mounted on a base and including a core having residual magnetism; an actuating lever connected at one of its ends to said throw arm and pivoted at a point along its length on said base; a latch pivoted on said base, one end of which latch is adapted in a first pivoted position to engage said actuating lever whereby the said actuating lever is constrained against movement, the said end of said latch being adapted in a second pivoted position to permit the movement of said actuating lever; a first permanent magnet fastened to said latch, the said latch being adapted to move the poles of said first magnet into contact with and away from said core; a second permanent magnet fastened to said actuating lever at the other end of said lever, the said actuating lever being adapted to move the poles of said second magnet into contact and away from said core; whereby the residual magnetism of said coil holds the magnet on actuating lever and the magnet on said latch in contact with said core.

References Cited in the file of this patent
UNITED STATES PATENTS 2,121,595     Harrison _____ June 21, 1938